United States Patent
Zahn

[15] 3,668,652
[45] June 6, 1972

[54] APPARATUS FOR CONTROLLING JUMPING OPERATIONS FOR A PROGRAM CONTROL EQUIPPED WITH STEPPING MECHANISM

[72] Inventor: Ulrich Zahn, Aargau, Switzerland
[73] Assignee: Sprecher & Schuh AG, Aarau, Switzerland
[22] Filed: Feb. 11, 1971
[21] Appl. No.: 114,573

[30] Foreign Application Priority Data

Apr. 2, 1970 Switzerland ..........................4924/70

[52] U.S. Cl. .......................................................340/172.5
[51] Int. Cl. ..........................................................G06f 9/00
[58] Field of Search ................................340/172.5, 166

[56] References Cited

UNITED STATES PATENTS

| | | | |
|---|---|---|---|
| 3,274,556 | 9/1966 | Paul | 340/172.5 |
| 3,350,692 | 10/1967 | Cagle | 340/172.5 |
| 3,371,320 | 2/1968 | Lachenmayer | 340/172.5 |
| 3,525,082 | 8/1970 | Jensen | 340/172.5 |
| 3,579,198 | 5/1971 | Giunta | 340/172.5 |

*Primary Examiner*—Paul J. Henon
*Assistant Examiner*—Sydney R. Chirlin
*Attorney*—Waters, Roditi, Schwartz & Nissen

[57] ABSTRACT

There is disclosed an apparatus for controlling the jump operations of a program control which is generally manifested by the features that, there is provided a control circuit which can be optionally connected at any one of the output lines of a stepping mechanism and controlled by the signal of the output line, this control circuit serving for generating the jump or stepping signals for the switching stages of the switching mechanism which are to be momentarily jumped. This control circuit is coupled with the input side of an electrical control device for the stepping mechanism. In response to a jump signal, the control device advances the stepping mechanism independent of the switching signals of the input line and blocks the delivery of positioning signals at the output rails.

18 Claims, 6 Drawing Figures

3,668,652

1

APPARATUS FOR CONTROLLING JUMPING OPERATIONS FOR A PROGRAM CONTROL EQUIPPED WITH STEPPING MECHANISM

BACKGROUND OF THE INVENTION

The present invention relates to an improved apparatus for controlling the jumping or stepping operations of a program control possessing a stepping mechanism in which the input and output lines of the switching stages of the stepping mechanism can be electrically connected by diodes with input and output rails crossing these lines, the stepping mechanism in each case being advanced from one switching stage to the next switching stage when the input line of the next successive switching stage carries a switching signal.

In the case of stepping mechanisms and shift registers, the switching operation at the individual switching stages basically occurs in sequence. The switching or advancing signal is generally delivered by a timing device and during each cadence or step the stepping mechanism or the shift register is advanced one step until reaching the last switching stage, whereupon, then, the first switching stage again follows.

Frequently, program controls are equipped with stepping mechanisms or shift registers. Such program controls involve so-called linear timing chains where the individual steps are passed in sequence. The switching operation from one step to the next successive step, and therefore, the duration of the stepping operation is thus determined by information received from the installation to be controlled and/or by programmed expired time periods in accordance with logical switching operations. Delivery of output signals, that is, the transmission of positional commands by the individual switching stages naturally occurs in the same sequence unless the delivery of output signals is blocked by individual switching stages. To given ones of the switching stages it is possible to couple further linear timing chains so that during elapse of the main program it is possible to switch over to subordinate programs via appropriate input signals, and upon completion of the subordinate program to again switch back to the main program. Furthermore, in linear timing chains, it is also possible to interrupt the program at any given step and to revert back to the beginning of the program. Notwithstanding these possibilities concerning the progression of the program linear timing chains only enable the performance of relatively simple programs.

Programs of a more complicated nature have resulted in the development of prior art equipment where the individual steps or cycles can be triggered by special addresses. By calling-in such addresses it is possible to form each optional operationally-dependent step sequence within the realm of the available steps. Since changes in the address signals are possible, for instance, through external influences, extensive security measures and control circuits are generally necessary, rendering such address program controls complicated and expensive.

SUMMARY OF THE INVENTION

Accordingly, a real need is still existent in the art for an improved apparatus for controlling the jumping or stepping operations of a program control utilizing a stepping mechanism and which apparatus is not associated with the aforementioned drawbacks of the prior art constructions. Hence, a primary objective of the present invention relates to the provision of an improved apparatus for controlling such jumping operations for a program control, which is not associated with the aforementioned drawbacks of the prior art and which is capable of reliably satisfying the existing need.

Still a further significant object of the present invention is to provide apparatus for controlling the jumping operations of a program control utilizing a stepping mechanism, which apparatus is relatively simple in construction, operationally reliable, and also renders possible performance of complicated program controls with a simple linear timing chain.

2

Now, in order to implement these and still further objects of the invention, which will become more readily apparent as the description proceeds, the inventive apparatus is generally manifested by the features that, there is provided a control circuit which can be optionally connected at any one of the output lines of the stepping mechanism and controlled by the signal of the output line, this control circuit serving for generating the jump or stepping signals for the switching stages which are to be momentarily jumped. This control circuit is coupled with the input side of an electrical control device for the stepping mechanism. In response to a jump signal, the control device advances the stepping mechanism independent of the switching signals of the input line and blocks the delivery of positioning signals at the output rails.

It is preferable if the control circuit embodies a storage circuit for storing so-called decision signals for indicating whether or not a jumping operation should take place, a jump instruction circuit controlled by signals at the output lines of the stepping mechanism for producing jump order or instruction signals designating switching stages which are to be jumped, and a coincidence circuit coupled with the storage circuit and the jump instruction circuit and upon coincidence of a jump decision signal and a jump instruction signal delivers a jump signal to the control device.

Furthermore, at the input side of the storage circuit there can be provided a circuit controlled by signals at the input rails for producing the decision signals, and additionally, there can be provided an interrogation circuit for reading in the decision signals into the storage circuit. This interrogation circuit, itself controlled by the output signals of the jump instruction circuit, by the signals of the output line of the stepping mechanism or by the decision signals, delivers reading signals to the storage circuit.

In the case of a program control using a shift register in which the input rails cross the input lines of the switching stages and the output lines of the switching stages of the shift register carry binary signals, it is possible to design the electronic or circuit components of the control circuit from simple known circuits for processing binary signals, as for example, logical circuits for "AND- or OR-" logical switching operations, monostable and bistable flip-flop circuits.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
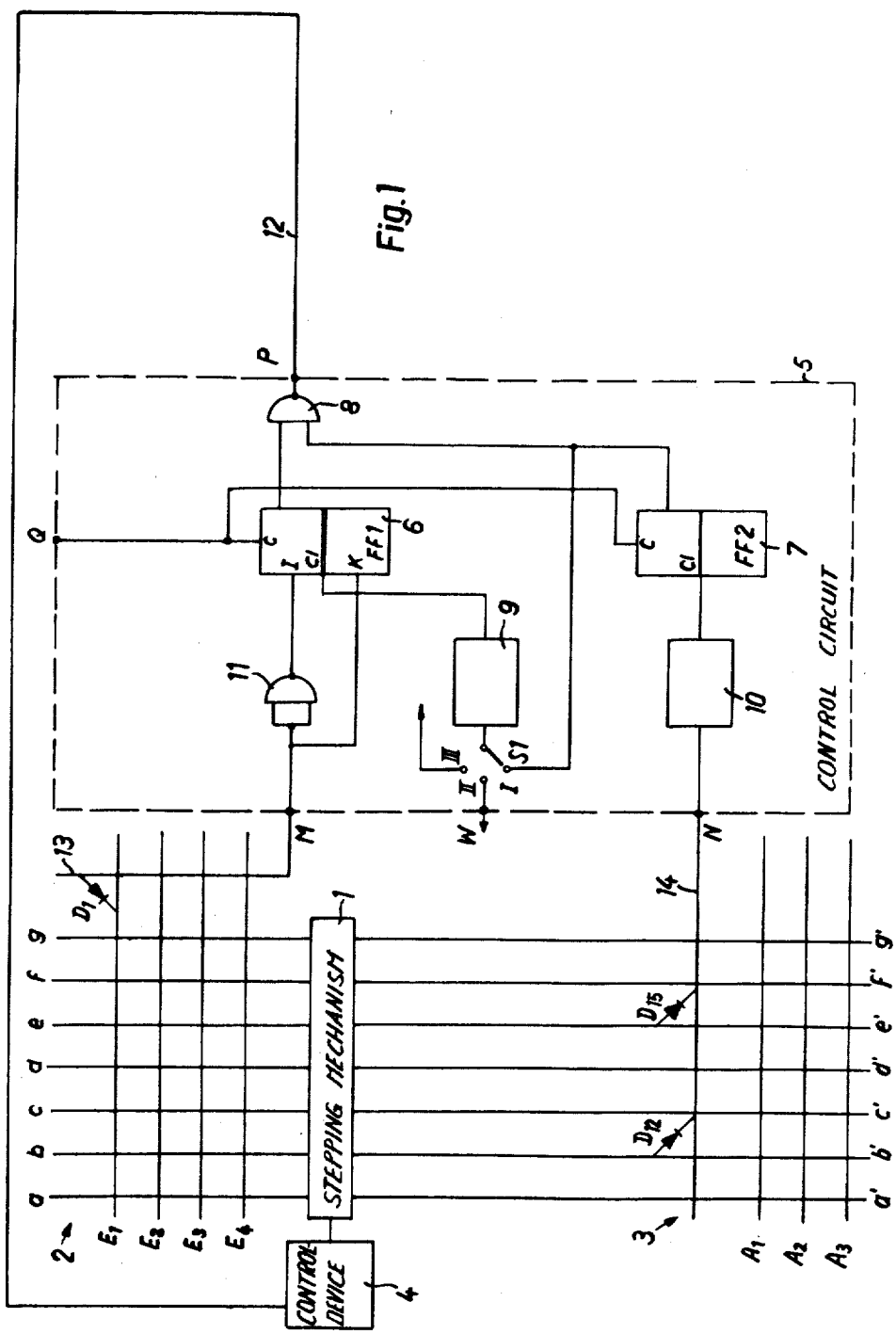
FIG. 1 schematically illustrates a block circuit diagram of a control circuit for a program control with shift register embodying an interrogation circuit for transmitting reading signals to a storage circuit, the interrogation circuit being coupled with the output side of a jump order or instruction circuit, and the storage circuit together with the jump instruction circuit being coupled with a coincidence circuit.

Describing now the drawings, the program control device schematically illustrated in FIG. 1 embodies a stepping mechanism 1 possessing $n$ switching stages, seven of which have been indicated by the reference characters $a, b, c, d, e, f$, and $g$. This program control further embodies an input crossbar distribution panel 2, an output crossbar distribution panel 3, a control device 4 for the stepping mechanism 1, and a control circuit 5 for producing jump or stepping signals for the control device 4.

Continuing, it will be observed that at the input crossbar distribution panel 2, hereinafter briefly referred to simply as the "input plane," the input conductors or lines $a, b, \ldots g$, depicted vertically extending in the drawing, of the switching stages of the stepping mechanism 1 cross-over a number of input bars or rails E, depicted horizontal position in the drawing, four such rails $E_1$, $E_2$, $E_3$ and $E_4$ having been indicated. These input bars or rails E are coupled with different conventional components, such as push buttons, terminal switches, monitoring systems and so forth, which deliver the operating parameters of the installation to be controlled and which are received from such components in known manner in the form of binary signals "O" and "L," these binary signals being indicative of the operating condition or state of the therewith coupled components. At the crossover points or junctions of the input rails E with the input lines $a, b, \ldots g$, and so forth, it is possible to couple diodes so as to be able to connect each such input line with optional ones of the input rails E and to apply to each switching stage of the stepping mechanism 1 the signals of the input rails in a logical switching operation, such as "AND" or "OR."

At the output crossbar distribution panel 3, hereinafter conveniently referred to as the "output plane," the output conductors or lines $a', b' \ldots g'$ and so forth shown, extending in vertical direction in the drawing of FIG. 1, of the switching stages of the stepping mechanism 1 cross with horizontal extending outlet or output rails A, three such rails $A_1$, $A_2$, $A_3$ having been conveniently depicted in FIG. 1 Each output rail A is coupled, for instance, through the agency of a power amplifier with a positioning element, for instance a relay or protective device of the installation to be controlled. Just as was the case for each of the so-called input plantes, each output line of the stepping mechanism 1 can be connected by diodes with optional ones of the output bars or rails A so that a positioning signal (positioning command) at an output line actuates all positioning elements coupled therewith. The output lines $a', b', \ldots g'$, and so forth carry binary signals "O" and "L," one of which, such as for instance the "L"- signal is selected as the positioning command. Switching or advance from one switching stage to the next successive switching stage, that is, from one step to the other, occurs by means of information delivered from the installation to be controlled and/or by programmed time sequences or courses in appropriate logical switching connection therewith, and specifically, via the input planes. Accordingly, the switching mechanism 1 only then switches to the next switching stage if the conditions determined by the plugged-in diodes are fulfilled and the input line of this next successive switching stage carries a switching signal. In order to be able to carry out cyclic operation the last switching stage is coupled with the first switching stage and the last step is terminated when the conditions for the first switching stage have been fulfilled. The control device 4 responds to input signals and brings about that during the duration of a "jump" signal the stepping mechanism 1 continuously switches from one stage to the next, without taking into consideration whether or not the switching conditions for the switching stages have or have not been fulfilled, and the output lines of such switching stages have not received any command signals.

In the drawing, there have only been schematically shown the most important components of the system which have been designated by associated reference characters and all of the remaining conventional components of standard program controls with stepping mechanisms and associated circuitry have been conveniently omitted for purposes of preserving clarity in illustration and to emphasize and elucidate the underlying concepts of the instant invention.

Now, it will be recognized that the input signal for the control device 4, that is the "jump" signal is delivered by means of a control circuit 5, wherein FIG. 1 schematically illustrates a particularly simplified embodiment of such control circuit. The illustrated control circuit 5 of this embodiment of FIG. 1 will be seen to possess two inputs M and N and one output P connected via a conductor or line 12 with the input of the control device 4. An information input line or conductor 13 crosses the input bars or rails E and is coupled with the first input M of the control circuit 5. By means of diodes $D_1$, $D_2$, and so forth, it is possible to electrically couple the information input line 13 with optional ones of the input rails E. By means of the plugged-in diodes $D_1$, $D_2$, etc., the jump conditions are determined, that is, a condition determined by the course of the process of the installation to be controlled at one or more of the transmitters connected with the input rails E, upon the occurrence of which the stepping mechanism 1 should jump certain steps or cadences. If a number of transmitters determine the jump conditions, then the signals of the corresponding input rails E are delivered in a logical switching operation or configuration, "AND" or "OR," to the information input line 13.

Information input line 13 therefore carries a binary logical "O" or "L" signal which indicates whether or not a jump or stepping operation is to be performed. This signal is delivered to a storage circuit 6 which, by means of its output in turn delivers an appropriate signal to one of the inputs of a logical coincidence circuit 8. The output of this logical coincidence circuit 8 is electrically coupled with the output P of the control circuit 5.

In the illustrated embodiment, the storage circuit 6 comprises a first flip-flop FF1, one input I of which is connected via an inverter 11, and AND-element with a negated output, and the other input K of which is directly connected with the input M. At both inputs I and K, there thus always appears the signal and the inverse signal of the information input line 13.

To generate a jump command signal, that is to say, a signal which determines from which step to which other step a jump should be undertaken, it will be seen that an "instruction" or "order" line or conductor 14 at the output plane of the stepping mechanism 1 crosses the output conductors or lines $a', b' \ldots g'$ of stepping mechanism 1. The instruction conductor or line 14 is coupled with the second input N of the control circuit 5, and can be connected by means of diodes $D_{11}$, $D_{12}$ . . . etc., with optional ones of the output lines $a', b' \ldots g'$ and so forth. By plugging-in the diodes $D_{11}$, $D_{12}$ . . . etc. the steps (output lines) which are to be jumped are determined. The instruction line 14 is coupled through the agency of the second input N with a circuit for generating jump instruction signals, which in each case begin with a first plugged-in step at the instruction line 14 and terminate with a next successive plugged-in step. In the illustrated embodiment, this circuit consists of a second flip-flop FF2, the positional input $C_1$ of which is connected via a pulse shaper 10, for instance a monostable flip-flop circuit, with the second input N and via such with the information line or conductor 14. The output of this circuit 7 for generating such jump instruction signals, that is, in this case the output of the second flip-flop FF2 is coupled with the second input of the logical coincidence circuit 8, which in the control circuit 5 of the embodiment illustrated in FIG. 1 is an AND element with a negated output.

At the control circuit 5 of the arrangement of FIG. 1, the output of the second flip-flop FF2 is additionally connected via a switch S1, the different switching positions I, II, III of which are intended indicate the yet to be described embodiments of the control circuit, with the input of a pulse shaper 9. Pulse shaper 9 likewise may be constructed, for instance, as a monostable flip-flop circuit. The output of pulse shaper 9 is coupled with the position input $C_1$ of the first flip-flop FF1. Furthermore, the control circuit 5 possesses a clearing or extinguishing input Q, at which there can be applied signals for eradicating or extinguishing the information storage circuit 6, for instance by means of any standard non-illustrated manually-actuated device. Since the information storage circuit 6 of the illustrated control circuit constitutes a flip-flop FF1 the extinguishing input Q is coupled with the resetting input C of this flip-flop FF1.

Let it be assumed that the control device 4 of the stepping mechanism 1 will advance or switch for one step or jump when a logical "O" signal appears at its input and that the stepping mechanism 1 normally advances or switches when a logical "L" signal appears at the input of the control device 4. To begin the course of a process both of the flip-flops FF1 and FF2 should be reset, that is their outputs should possess a logic "O" signal, and accordingly, at the output of the logical coincidence circuit 8 there appears a logic "L"- signal. The steps two to five should be jumped if the input bar or rail E1 carries a logic L-signal. Accordingly, in the input plane of the stepping mechanism the diode $D_1$ should be plugged-in and at the output plane thereof the diodes $D_{12}$ and $D_{15}$. If the stepping mechanism 1 switches to the second step then the pulse shaper stage 10 receives a logic L-signal via the instruction line 14 and delivers a positioning pulse of a certain width and amplitude through the positional or position input C1 of the second flip-flop FF2. The output of the second flip-flop FF2 thus carries a logic L-signal. The logic L-signal appearing, therefore, at the second input of the logical circuit 8, however, initially remains ineffectual since its first input is still carrying a logical O-signal. The output L-signal of the second flip-flop FF2 additionally brings about that, by means of the pulse shaper stage 9, there is delivered a positioning pulse to the position input C1 of the first flip-flop FF1. With this positioning pulse of the pulse shaper stage 9 the information signal of the information line 13 is read-in to the storage circuit 6, that is, into the first flip-flop FF1. If the jump condition has been fulfilled, then the input rail $E_1$ carries a logic L-signal and the input line 13 has applied thereto a logic O-signal. The input K of the first flip-flop FF1 then receives a logic O-signal and the input I, owing to the action of the inverter 11 receives a logic L-signal, so that upon receiving the read-in pulse, the output of this flip-flop FF1 and therefore the first input of the logical circuit 8 carries a logic L-signal. Since, as has been previously explained, the second input of the logical circuit 8 likewise carries a logic L-signal such delivers a logic O-signal (jump command) to the control device 4. If the jump conditions have not been fulfilled, then with the read-in pulse of the pulse shaper stage 9, there are read into the input K of the first flip-flop FF1 a logic L-signal and at the input I thereof a logic O-signal, the logic O-signal at the output of the flip-flop FF1 and at the input of the logic circuit 8 remain and the latter delivers to the control device 4 a logic L-signal (non-jump command). Upon the receipt of a jump signal (logic O-signal) the control device 4 switches the stepping mechanism 1 without output signals having been delivered at the output lines of the further switching stages.

Upon reaching the fifth switching stage, the pulse shaper stage 10 again receives from the information line 14 a logic L-signal, whereupon via a position pulse delivered by the information line 14 the second flip-flop FF2 is reset into the first operating condition with a logic O-signal appearing at the output. Consequently, the inputs of the logic circuit 8 now exhibit logic O- and L- signals so that its output again carries a logic L-signal (non-jumping command). The logic L-signal arriving at the control device 4 of the logical circuit 8 brings about that since the jump command now is completed, the stepping mechanism 1 will now normally switch from one switching stage to the next switching stage. After the jumping operation, the storage circuit 6, in other words the first flip-flop FF1 can be extinguished by actuating the clearing or extinguishing mechanism, for instance, manually be means of a signal at the extinguishing input Q of the control circuit 5, so that this control circuit is in a preparatory state for controlling a different jump operation. In the event that during a cyclic running of the process under the same jump conditions, the jumping operation should be repeated a number of times then the extinguishing operation is only first carried out at a later period of time.

As already mentioned, the jumping condition can be determined by a number of input signals which appear in logical configuration in any suitable fashion at the input rails E. By slight changes in the input circuit of the control circuit 5 such combined jumping conditions can be taken into account.

Figure 2:
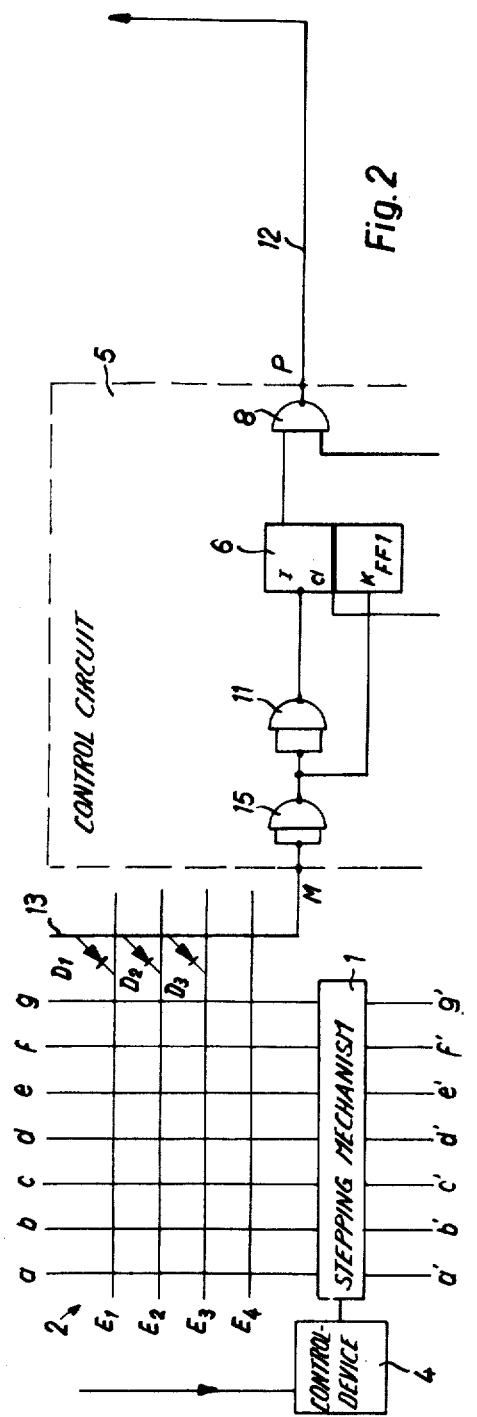
FIG. 2 schematically illustrates in block circuit diagram the construction of a circuit for generating decisional signals for the storage circuit of FIG. 1.

Should, for instance, a jumping operation then be triggered if all of the input rails coupled with the information input line 13 carry a logic O-signal, then as best shown by referring to the circuitry of FIG. 2, there should be connected in series in front of the inverter 11 and AND-circuit 15 with a negated output. Only if all of the therewith connected input rails or bars carry logic O-signal will the output of this AND-circuit 15 exhibit a logic O-signal, and therefore the K input of the first flip-flop FF1 will likewise exhibit a logic O-signal and the I-input thereof a logic L-signal, which with the previously described circuit arrangement corresponds to the condition for the generation of a jump signal "O."

Figure 3:
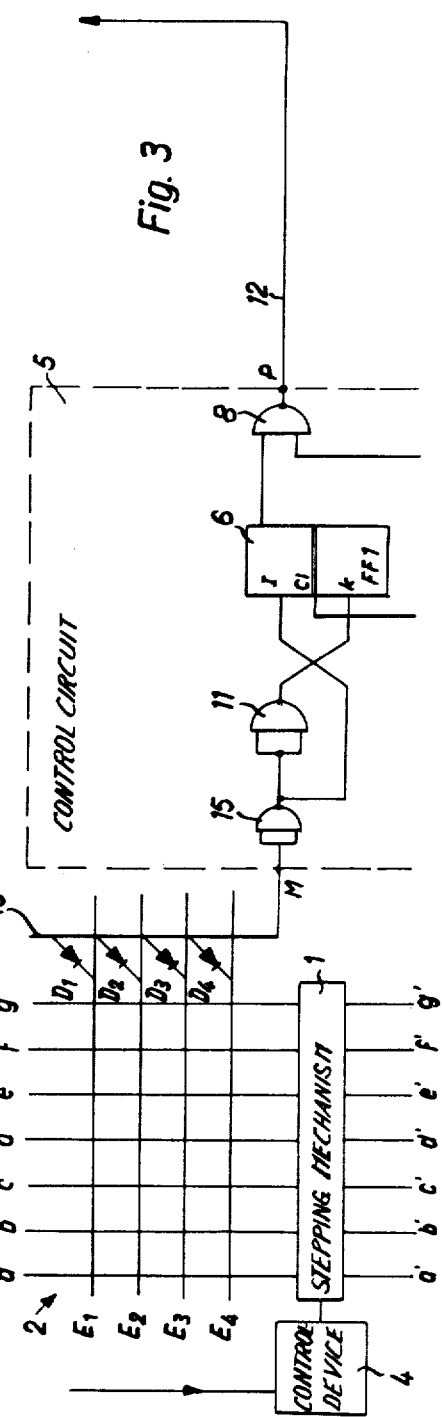
FIG. 3 illustrates a different embodiment of circuitry for generating such decisional or decision signals.

In the input circuit of the control circuit 5 depicted in FIG. 3, the first flip-flop FF1 again, just as was the case in FIG. 1, has an inverter 11 connected in front of such flip-flop. The I-input of the flip-flop FF1, however, in this case is connected with the input of the inverter 11 and the K-input of the flip-flop FF1 with the output of the inverter 11, as clearly shown. As soon as one of the associated inputs (input rails E) carries a logic O-signal there is obtained the condition for a jump signal, that is, for a logic O-signal at the output of the logic circuit 8. In the control circuit under consideration, the period of time for the interrogation of the information input line 13 is fixed and identical with the beginning of a jump instruction signal. A control circuit with selectible interrogation time-period has been shown in FIG. 4. There the control circuit 5 of FIG. 4 essentially corresponds to the control circuit of the circuit arrangement of FIG. 1. However, the switch S1 in this case is in its switching position II which is coupled with a further input W of the control circuit. Other modifications of the circuitry of FIG. 4 and differences in relation to the embodiment of FIG. 1 will not be considered and further explained at a later point in this description.

Now, it will be observed that in the output plane of the stepping mechanism 1, there is arranged a further conductor 16, which hereinafter will be referred to conveniently as the "interrogation"c- conductor 16, and will be seen to crossover the switching stages. This interrogation conductor 16 can be connected hy diodes $D_{21}$, $D_{22}$, ... $D_X$ with optional ones of the output lines $a'$, $b'$ ... $g'$, etc. and is connected at the input W of the control circuit. Since, as stated above, the switch S1 is in the switch position II, the input of the pulse shaper stage 9 is now coupled with the interrogation conductor or line 16 and no longer with the output of the second flip-flop FF2, so that the read-in pulse for the first flip-flop FF1 can be generated independently of the output signal of the second flip-flop FF2. The point of time during interrogation with respect to the stepping operation is determined by connecting the interrogation line 16 with the output lines $a'$, $b'$, ... $g'$. If, for instance, the interrogation line 16 is connected by a diode $D_{21}$ with the output line $a'$ of the first switching stage of the stepping mechanism 1, then interrogation of the information input line 13 occurs as soon as the stepping mechanism has switched to the first switching stage. The jump operation can also be repeated a number of times with the same jump conditions during a linear (non-cyclic) stepping chain. If, owing to plugging-in of diodes a number of such jumping operations are provided for at the instruction line 14 and if from time to time the storage circuit 6, that is, the first flip-flop FF1 should be extinguished, then with the embodiment possessing selectible interrogation time-periods prior to the next successive jump there must be placed a further diode at the interrogation line 16. It can be required that the storage circuit 6 should be automatically extinguished simultaneously with the completion of each jump command. A suitable embodiment to this end has been shown in FIG. 4 by the provision of a switch S$_2$ at the extinguishing line between the extinguishing input Q of the control circuit 5 and the resetting input C of the first flip-flop FF1. In the first switch position I, there is produced this aforesaid connection Q–C. In the switching position II, the connection is interrupted and the resetting input C of the flip-flop FF1 is coupled via an extinguishing circuit 17 with the output of the second flip-flop FF2. The extinguishing circuit 17 can be similarly constructed as the pulse shaper stages 9 and 10, however, only responds to the descending flank of an input signal and possesses a negated output. Such a descending pulse flank appears at the output of the second flip-flop FF2 at the end of each instruction signal. After the decay of the extinguishing pulse there again appears at the resetting input C of the first flip-flop FF1 a logic L-signal and the flip-flop FF1 is in a preparatory stage for storing an information signal.

The program control can contain further circuits for triggering jump operations at the stepping mechanism 1. As soon as one of these additional circuits has delivered a jump command, then the delivery of jump signals by the other additional circuits and by the control circuit must be blocked. In order to connect together such additional jump circuits, the control circuit 5 is advantageously equipped with a blocking circuit 18 having the function of delivering a jump command to the control device 4 which has been received from one such additional jump circuit and for the duration of this jump command delivering a blocking signal to the other additional jump circuits as well as also blocking the jump instruction of the control circuit 5.

Figure 4:
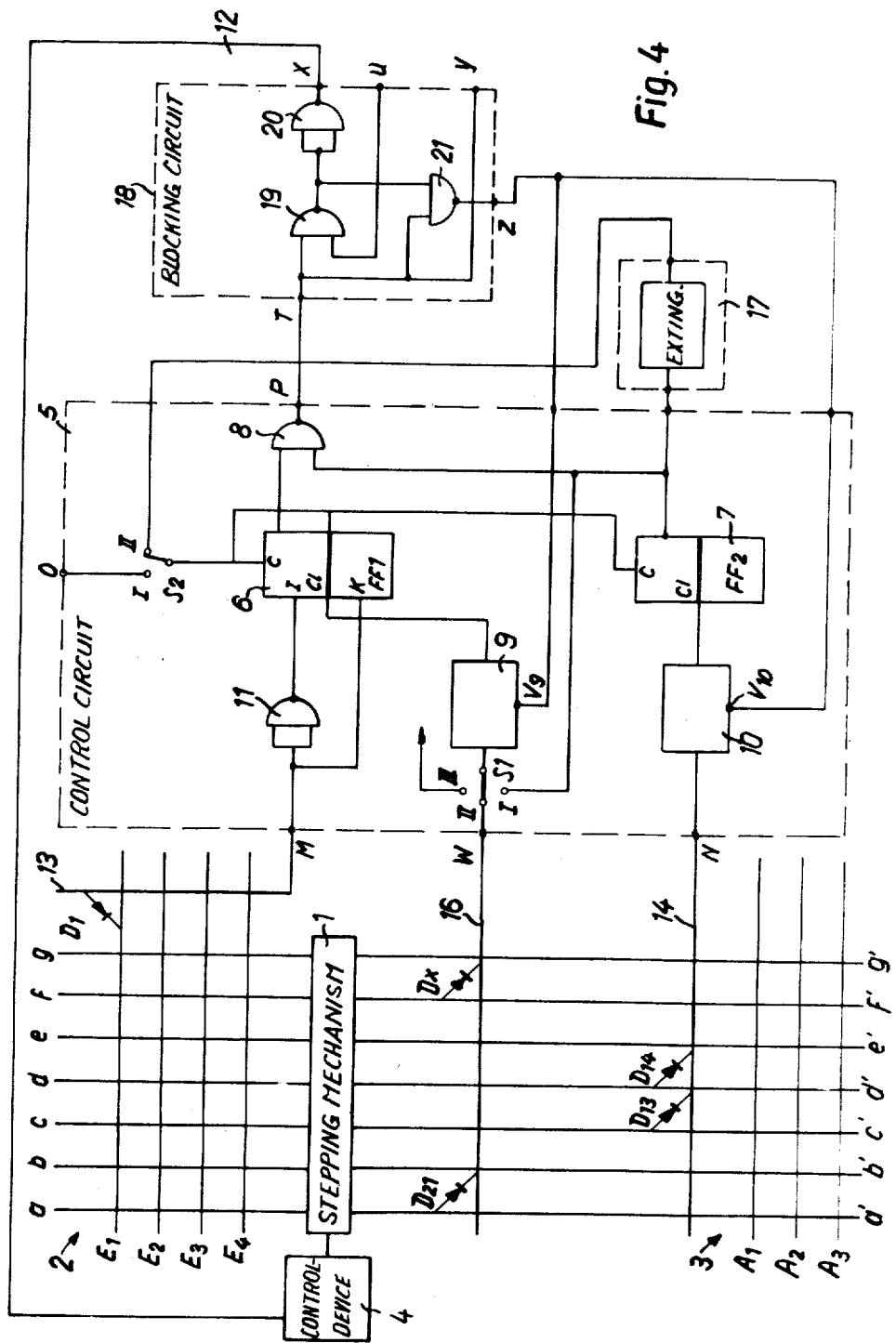
FIG. 4 illustrates the block circuit diagram of FIG. 1 equipped with additional circuitry.

Now in FIG. 4, there is schematically illustrated an embodiment of a very simple form of a blocking circuit 18. Here it will be seen that the blocking circuit 18 possesses two inputs T and U and three outputs X, Y and Z. The first input T is connected to the output P of the logic coincidence circuit 8 and the other input U is coupled via a non-illustrated connection element with the outputs of the additional jump circuits, which have not been particularly shown in the drawing. The first output X of the blocking circuit 18 is electrically coupled to the input line 12 for the control device 4, the second output Y is coupled via suitable connection elements with the additional jump circuits and conducts to such blocking signals, and the third output Z is connected to a blocking input of the pulse shaper stage 10 coupled with the instruction line or conductor 14. In the event that the control circuit 5 works with a fixed interrogation, that is to say, that the switch S$_1$ is located in the switch position I, then the output Z of the blocking circuit can simultaneously also be connected with a blocking input of the pulse shaper stage 9.

The blocking circuit 18 contains three AND-circuits with negated outputs. The one input of the first AND-circuit 19 is connected to the output of the logical circuit 8 and simultaneously with the one input of the third AND-circuit 21 as well as with the output Y of the blocking circuit. The other input of the first AND-circuit is connected to the second input U of blocking circuit 18. The second AND-circuit 20 serves as an inverter and its output forms the output X of the blocking circuit. The output of the first AND-circuit 19 and the input of the second AND-circuit 20 as well as the other input of the third AND-circuit 21 are coupled with one another, as shown.

A logic L-signal transmitted from the output P of the control circuit 5 to the blocking output Y of the blocking circuit 18, which transmitted L-signal signifies for the control device 4, as previously explained, a signal meaning "do not jump" should release the additional jump circuits coupled with the output Y for the delivery of jump signals. If there is delivered from one of these circuits a jump signal, that is, a signal O at the input U of the blocking circuit 18, then the output of the first AND-circuit 19 carries a logic L-signal and the output of the second AND-circuit 20 carries a logic O-signal which is further transmitted via the line or conductor 12 as a jump signal to the control device 4. Both of the inputs of the third AND-circuit 21 have applied thereto logic L-signals and therefore its output carries a logic O-signal transmitted as a blocking signal to the blocking input V of the instruction pulse shaper stage 10, and, if desired, also to the blocking input of the interrogation pulse shaper stage 9, blocking such pulse shaper stages. Upon termination of the jump signal delivered to the input U of the blocking circuit 18, both of the inputs of the first AND-circuit 19 have applied thereto logic L-signals and accordingly, the output of the second AND-circuit 20 again carries a logic L-signal (no jump) and the output of the third AND-circuit 21 likewise carries a logic L-signal, so that the blocking action for the pulse shaper stages 9 and 10 is again removed.

Figure 5:
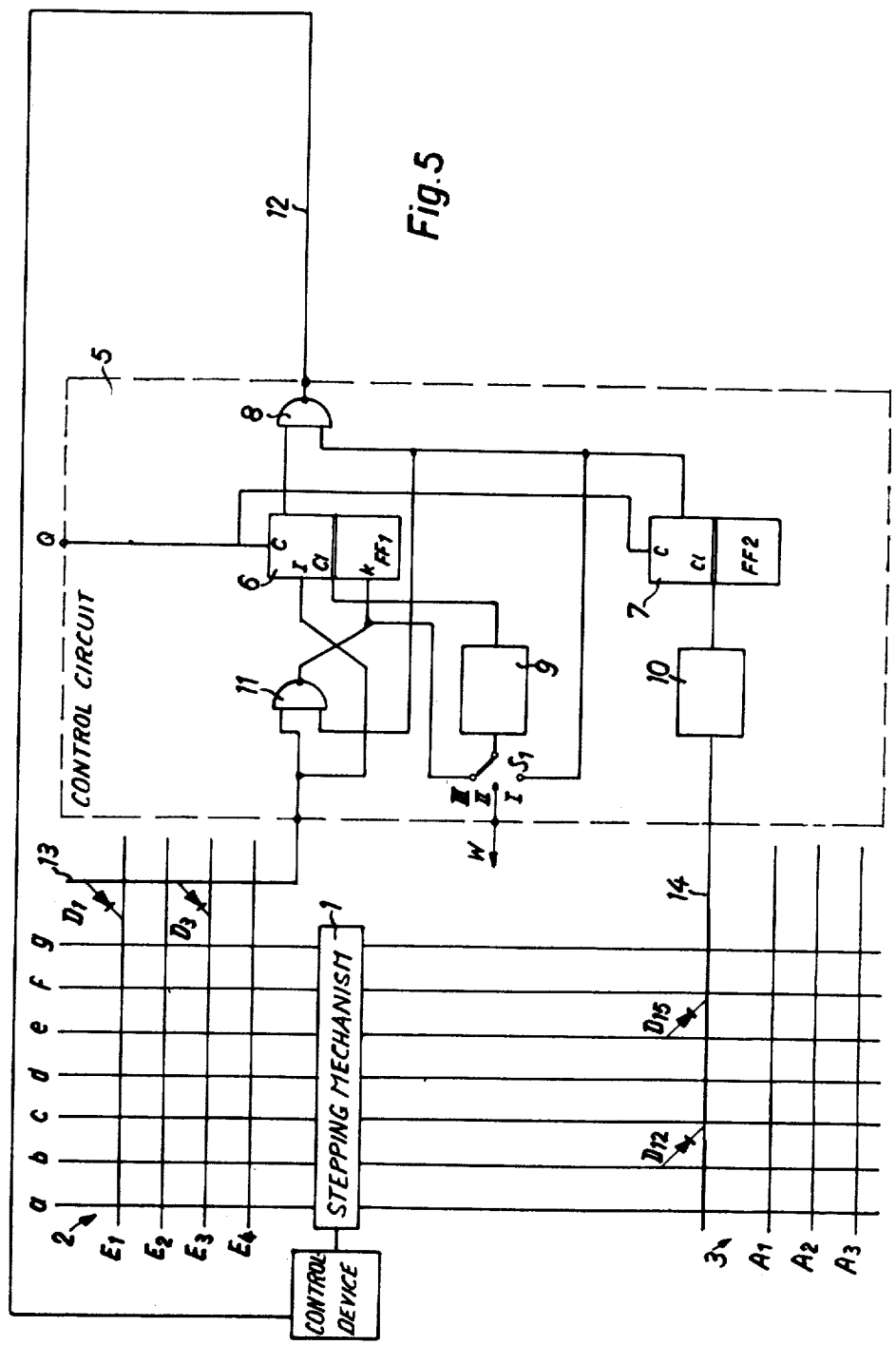
FIG. 5 illustrates the control circuit of FIG. 1 wherein, however, the interrogation circuit is not controlled by the jump instruction signals rather by the decision signals.

In the exemplary embodiment under consideration at one time interrogation of the information input line 13 is fixedly associated with the jump steps (switch position I of switch S1), and another time interrogation was independently adjustable at the interrogation line or conductor 14 (position II of the switch S1). It can happen that during a prescribed jump step or cycle the jumping or stepping operation should only then be carried out if the jump conditions have regulated themselves, that is to say, that the first diode applied at the instruction line 14 only indicates the possible beginning of the jump, the actual beginning of the jump operation, however, is determined via the signal of the information input line 13. During the step or interval provided for the jumping operation there is accordingly necessary continuous interrogation of the information input line 13. FIG. 5 illustrates an appropriate circuit modification for this purpose. Here switch S1 is located in switch position III where the input of the pulse shaper stage 9 is coupled to the K-input of the first flip-flop FF1. The K-input of the flip-flop FF1 is furthermore coupled to the output of the logical circuit 11 which, in this embodiment is not coupled as an inverter, rather as an AND-circuit with a negated output. The I-input of the flip-flop FF1 is coupled to one input of the AND-circuit 11 which is also connected with the information input line 13. The other input of AND-circuit 11 is electrically coupled with the output of the second flip-flop FF2.

As soon as the stepping mechanism 1 reaches the switching stage determined by the first plugged-in diode at the information line 14 the output of the pulse shaper stage 10 carries a logical L-signal. This logic L-signal is applied to the lower respective situated inputs of both logical circuits 8 and 11 shown in the drawing. It should be assumed that at this time the information input line also carries a logical O-signal that is, that the jump conditions have not yet been fulfilled. Then, the output of the first flip-flop FF1 carries a logical O-signal and the output of the logical circuit 8 carries a logical L-signal (no jump). The stepping mechanism 1 notwithstanding the jump information therefore switches normally further, and specifically, for such length of time until the jump condition has been fulfilled and the information input line 13 carries a logical L-signal. As soon as this occurs, the I-input of the first flip-flop FF1 receives a logical L-signal, its K-input a logical O-signal, and the pulse peak at the input of the pulse shaper stage 9 drops from L to O, resulting in its output delivering a positioning pulse to the position input of the first flip-flop FF1. With this position pulse the output of the first flip-flop FF1 delivers a logical L-signal to the logical circuit 8 which thereafter delivers a logical O-signal, that is, a jump signal to the control device 4.

With the use of a shift register as the stepping mechanism 1, the construction of the circuitry becomes particularly simple.

Figure 6:
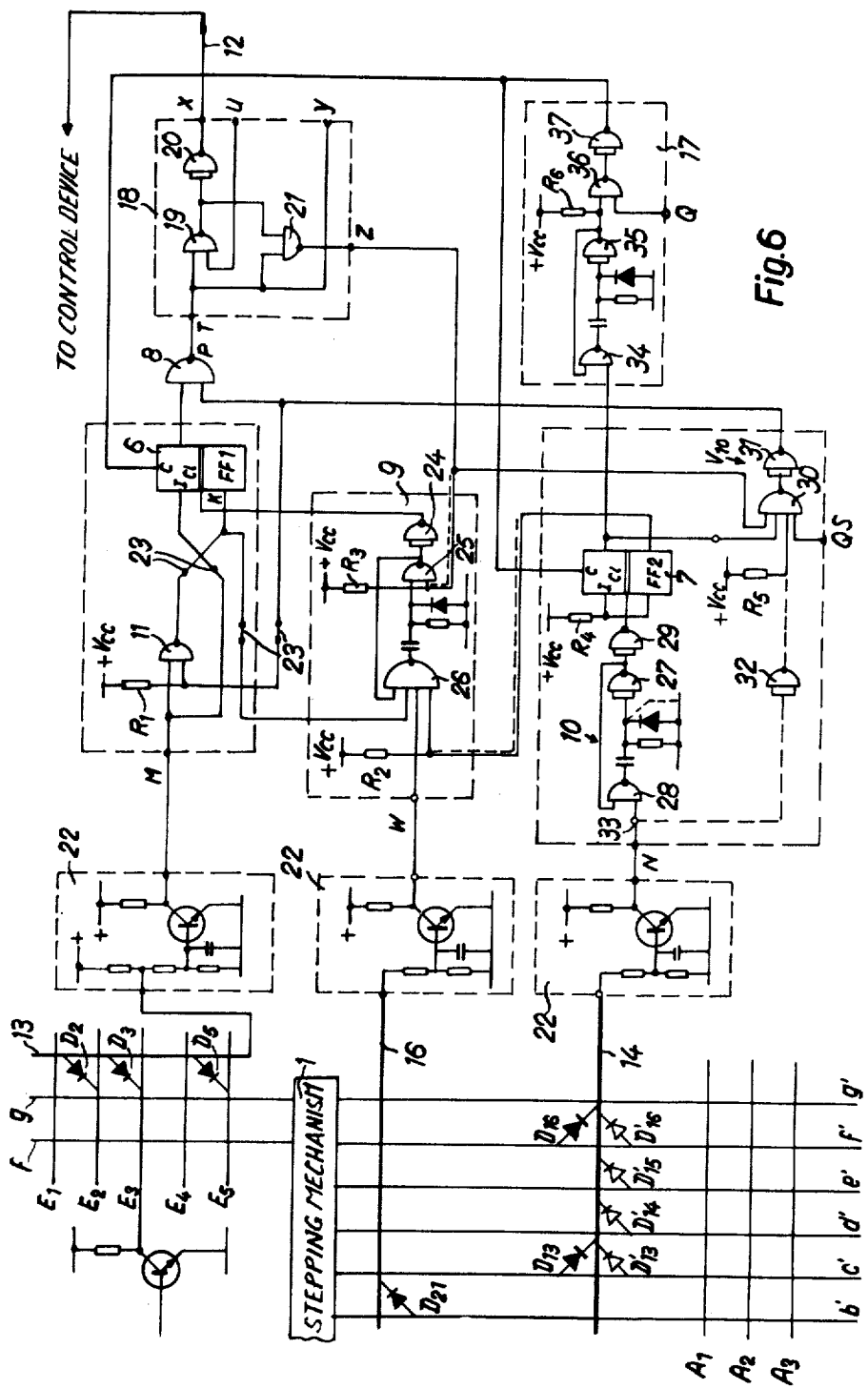
FIG. 6 is a detailed circuit diagram of the different embodiments of control mechanism embodied in the circuitry of FIGS. 1 to 5 inclusive.

FIG. 6 schematically illustrates, however, with greater detail the heretofore described control circuit for a shift register. This control circuit, apart from the already mentioned flip-flop circuit FF1 and FF2, that is the bistable flip-flop circuits, further contains as pulse shaper stages 9, and 10 and 17 monostable flip-flop circuits and, with the exception of the pulse amplifiers 22 coupled to the input lines (information input line 13, instruction line 14 and interrogation line 16) a number of AND-circuits with negated outputs, so-called NOT-AND circuits (N-AND). In other words, this circuitry embodies relatively few and standard or uniform circuit components which can be assembled in a building block system into the individual previously described circuit variations.

In FIG. 6, there have been conveniently utilized the same reference characters which have already been heretofore used in connection with the previously described circuit components of the heretofore considered embodiments. In order to generate logical O- and L-signals, the circuit is connected with a zero or null-conductor and a conductor carrying a signal voltage $+V_{CC}$. The circuit components coupled with the information input line 13 have already been previously described. The one input of the NOT-AND-circuit 11 is coupled via an amplifier 22 with the information input line 13 and its other input is connected via a resistor $R_1$ with the supply voltage $+V_{CC}$. The connection lines between the NOT-AND-circuit 11, the first flip-flop FF1 and the pulse shaper stage 9 are equipped with detachable connection locations 23 in order to be able to conveniently produce, as desired, one of the previously described circuit variations.

The pulse shaper stage 9 coupled via an amplifier 22 with the interrogation line or conductor 16 is a monostable flip-flop circuit with a logical input circuit 26 and an inverter 24 at the output side. One input of the flip-flop circuit leads to the K-input of the first flip-flop FF1, another is connected to the amplifier 22 for the signals of the interrogations lines 16, and a third input, coupled via a resistor $R_2$ to the supply voltage $+V_{CC}$, is coupled with the second output of the second flip-flop FF2 both of whose inputs I and K are connected via a resistor $R_4$ with the supply $+V_{CC}$. The output circuitry of the flip-flop circuit or shaper 9 forms a NOT-AND-circuit 25, the one input of which is connected via a resistor $R_3$ to the supply $+V_{CC}$ and is connected with the output Z of the blocking circuit 18 already described heretofore.

In FIG. 6, there are shown two different jump instruction circuits which can be connected via a common terminal or junction 33 and an amplifier 22 with the jump instruction line 14. The construction of one of the jump instruction circuits has essentially already been described and embodies the pulse shaper stage 10, the second flip-flop FF2 and a blocking element $V_{10}$. The pulse shaper stage 10, in this case once again is a monostable flip-flop circuit with a NOT-AND-circuit as the input circuit 28 and an inverter as the output circuit 27, which is connected via a further inverter 29 with the position input $C_1$ of the second flip-flop FF2, so that positive position pulses are delivered thereto. The blocking element $V_{10}$ consists of a NOT-AND-circuit 30 with four inputs, the output of which is connected via an inverter 31 with a respective input of the input NOT-AND-circuit 11 and the coincidence circuit 8 which likewise is constituted by an AND-circuit with a negated output. One input of the blocking element $V_{10}$ is connected to an input terminal QS, by means of which there can be externally delivered a blocking signal, a second input is connected to the first output of the second flip-flop FF2, a third input is connected with the Z-output of the blocking circuit 18, and a fourth input is connected via a resistor $R_5$ to the supply $+V_{CC}$.

The other jump instruction circuit embodies an inverter 32, the input of which, as has been shown by phantom lines, can be selectively connected to the terminal 33 and the output of which can be connected to the input of the blocking element $V_{10}$ coupled with the supply $+V_{CC}$. This inverter 32 therefore replaces the monostable flip-flop circuit, that is, the pulse shaper stage 9 and the second flip-flop FF2. The second jump information circuit, however, has the drawback, that in the output plane all of the steps to be jumped must be plugged-in by the diodes $D'_{13}$, $D'_{14}$, $D'_{15}$, $D'_{16}$, so that a correspondingly larger number thereof is necessary.

The extinguishing circuit 17 likewise contains a monostable flip-flop circuit, the input circuit 34 of which is coupled with a first output of the second flip-flop FF2. An inverter 35 forms the output circuit of this flip-flop circuit. The inverter output is connected via a resistor $R_6$ with the supply $+V_{CC}$ and simultaneously is connected with one input of a NOT-AND-circuit 36, the other input of which is connected to the resetting terminal Q of the control circuit. The output of the NOT-AND-circuit 36 is coupled via an inverter 37 with the extinguishing inputs C of both flip-flops FF1 and FF2.

As will be apparent, such a control circuit contains a relatively few number of uniform or standardized circuit units or components which can be assembled together according to the desired program control in accordance with the building block principle.

While there is shown and described present preferred embodiments of the invention, it is to be distinctly understood that the invention is not limited thereto but may be otherwise variously embodied and practiced with the scope of the following claims.

What is claimed is:

1. An apparatus for controlling the jumping operations for a program control comprising a stepping mechanism incorporating switching stages, an input crossbar distributor panel means and an output crossbar distributor panel means for said stepping mechanism, said input crossbar distributor panel means incorporating input lines and input rails crossing said input lines, said output crossbar distributor panel means incorporating output lines and output rails crossing with said output lines, said stepping mechanism advancing from one switching stage to the next successive switching stage when an input line of said next successive stepping stage carries a stepping signal, control circuit means electrically connectible with optional ones of said output lines of said stepping mechanism and controlled by signals appearing at said output lines for generating jump signals characteristic of the momentary switching stage to be jumped, an electrical control device for said stepping mechanism having an input and output, said control device output being coupled with said stepping mechanism, said control circuit means being coupled with said input of said electrical control device for said stepping mechanism, said control device advancing said stepping mechanism independent of stepping signals at said input lines in response to a jump signal and blocking the delivery of positioning signals to said output rails.

2. The apparatus as defined in claim 1, wherein said control circuit comprises storage circuit means for storing jump decision signals which indicate whether a jumping operation should or should not occur, jump instruction circuit means controlled by signals appearing at said output lines of said stepping mechanism for generating jump instruction signals characteristic of the switching stages of said stepping mechanism which are to be jumped, and coincidence circuit means coupled with said storage circuit means and said jump instruction circuit means for delivering a jump signal to said control device upon coincidence of a jump decision signal and a jump instruction signal.

3. The apparatus as defined in claim 2, further including electrical circuit means coupled to the input side of said storage circuit means and controlled by signals at said input crossbar rails for generating jump decision signals, and an interrogation circuit means for controlling the reading-in of the jump decision signals into said storage circuit means.

4. The apparatus as defined in claim 3, wherein said interrogation circuit means is coupled with the output of said jump instruction circuit means and at the beginning of each jump instruction signal delivers a reading signal to said storage circuit means.

5. The apparatus as defined in claim 3, wherein said interrogation circuit means is controlled by positioning signals via said output lines of said stepping mechanism and upon receipt of a positioning signal from an output line delivers a reading signal to said storage circuit means.

6. The apparatus as defined in claim 3, wherein said interrogation circuit means is controlled by said electrical circuit means for generating jump decision signals and upon the occurrence of a jump decision signal delivering a reading signal to said storage circuit means.

7. The apparatus as defined in claim 3, further including extinguishing circuit means, said storage circuit means including an extinguishing input connected via said extinguishing circuit means with an output of said jump instruction circuit means, said extinguishing circuit means delivering an extinguishing signal to said storage circuit means at the end of each jump instruction signal.

8. The apparatus as defined in claim 3, wherein said jump instruction circuit means further embodies blocking switch means responsive to blocking signals for blocking the jump instruction signals, blocking circuit means, said coincidence circuit means having an output connected via said blocking circuit means with the input of said control device, said blocking circuit means having an input for connecting circuit means delivering further jump signals, said blocking circuit means further embodying electronic switching means for delivering a blocking signal to said blocking switch means of said jump instruction circuit means upon the occurrence of a jump signal at said input of said blocking circuit means and to connect said input of said blocking circuit means with the input of said control device.

9. The apparatus as defined in claim 8, said interrogation circuit means embodying electrical circuit means responsive to blocking signals, said last-mentioned electrical circuit means being electrically coupled with said blocking circuit means and upon occurrence of a blocking signal blocking the delivery of reading signals.

10. The apparatus as defined in claim 8, useful for a program control with a shift register defining said stepping mechanism, wherein said electrical circuit means for generating jump decision signals includes an input coupled with an information input line crossing said input rails, said information input line being coupled by diode means to optional ones of said input rails in order to deliver in a logical switching operation the input signals to said last-mentioned electrical circuit means, conductor means, said interrogation circuit means and said jump instruction circuit having respective inputs coupled with a respective one of said conductor means which cross said output lines of said shift register, diode means for coupling said conductor means to optional ones of said output lines, and wherein said control circuit means, said extinguishing circuit means, and said blocking circuit means, are formed of electronic switching means processing binary signals.

11. The apparatus as defined in claim 9, wherein said storage circuit means comprises a bistable flip-flop circuit with two inputs and said electrical circuit means for generating jump decision signals comprises a logic circuit with a negated output, the one input of said flip-flop circuit being coupled with the output of said logic circuit and the other input of said flip-flop circuit being coupled with the input of said logic circuit, so that there appears at the inputs of said flip-flop circuit a jump decision signal in the form of a direct signal and an inverse signal respectively.

12. The apparatus as defined in claim 9, wherein said interrogation circuit means comprises a monostable flip-flop circuit having a logical circuit as the input circuit and a logical circuit as the output circuit, one input of the logical output circuit being coupled with said blocking circuit means for blocking interrogation signals.

13. The apparatus as defined in claim 9, further including a jump instruction input conductor for said jump instruction circuit means, said jump instruction circuit means comprising a series circuit of logical circuit means including a logical input circuit receiving an input signal for each step to be jumped via diode means plugged-in at said input conductor of said jump instruction circuit means, and a logical circuit of said series circuit for blocking the output signals upon the presence of a blocking signal which possess an input coupled with said blocking circuit means.

14. The apparatus as defined in claim 9, further including a jump instruction conductor, said jump instruction circuit means comprising a bistable flip-flop circuit having a position input and an extinguishing input, a monostable flip-flop circuit coupled between said position input and an input of said control circuit coupled with said jump instruction conductor, and at least one logic circuit means connected with the output of said bistable flip-flop circuit for blocking the output signal in response to a blocking signal, said monostable flip-flop circuit in each case delivering a positioning signal to said bistable flip-flop circuit during the first and the last step to be jumped, such steps being determined by two diode means plugged-in at said conductor for said jump instruction circuit means.

15. The apparatus as defined in claim 13, wherein said logic circuit means for blocking the output signals of the jump instruction circuit means possesses a further input for the optional delivery of blocking signals, said further input being coupled with an input terminal.

16. The apparatus as defined in claim 7 wherein said extinguishing circuit means contains a monostable flip-flop circuit having a logical circuit at its output circuit, an input of said logical circuit being connected to an input terminal for optional delivering of extinguishing signals and the output of said extinguishing circuit means being coupled with said extinguishing input of said storage circuit means and an extinguishing input of said jump instruction circuit means.

17. The apparatus as defined in claim 8, wherein said electronic switching means of said blocking circuit means comprise logical circuits.

18. The apparatus as defined in claim 17, further including extinguishing circuit means, and wherein said coincidence circuit means and said electrical circuit means for generating decision signals, said interrogation circuit means, said jump instruction circuit means said extinguishing circuit means, and said blocking circuit means comprise NOT- AND circuits.

* * * * *